United States Patent
Beauchamp et al.

(10) Patent No.: US 11,635,884 B1
(45) Date of Patent: Apr. 25, 2023

(54) SYSTEMS AND METHODS TO PROVIDE PERSONALIZED GRAPHICAL USER INTERFACES WITHIN A COLLABORATION ENVIRONMENT

(71) Applicant: Asana, Inc., San Francisco, CA (US)

(72) Inventors: Tyler Jeffrey Beauchamp, Bismark, ND (US); Louis Benjamin Lafair, Berkeley, CA (US); Eric Ming-Ming Zhao, San Diego, CA (US); Johanna Nancy Pajak, Richmond, CA (US); Luke Richard Puglisi, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 17/498,257

(22) Filed: Oct. 11, 2021

(51) Int. Cl.
G06F 3/048 (2013.01)
G06F 3/04847 (2022.01)
G06F 3/0482 (2013.01)

(52) U.S. Cl.
CPC ........ G06F 3/04847 (2013.01); G06F 3/0482 (2013.01)

(58) Field of Classification Search
None
See application file for complete search history.

(56) References Cited

U.S. PATENT DOCUMENTS

| | | | |
|---|---|---|---|
| 5,233,687 A | 8/1993 | Henderson, Jr. | |
| 5,524,077 A | 6/1996 | Faaland | |
| 5,530,861 A | 6/1996 | Diamant | |
| 5,608,898 A | 3/1997 | Turpin | |
| 5,611,076 A | 3/1997 | Durflinger | |
| 5,623,404 A | 4/1997 | Collins | |
| 5,721,770 A | 2/1998 | Kohler | |
| 5,983,277 A | 11/1999 | Heile | |
| 6,024,093 A | 2/2000 | Cron | |
| 6,256,651 B1 | 7/2001 | Tuli | |
| 6,292,830 B1 | 9/2001 | Taylor | |
| 6,332,147 B1 | 12/2001 | Moran | |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

Creating Tables with Fields from 2 Different Tables, published: 2009, publisher: Stackoverflow, pp. 1-2. (Year: 2009).

(Continued)

*Primary Examiner* — Thanh T Vu
(74) *Attorney, Agent, or Firm* — Esplin & Associates, PC

(57) ABSTRACT

Systems and methods to provide personalized graphical user interfaces within a collaboration environment are described herein. Exemplary implementations may: manage environment state information maintaining a collaboration environment; manage homepage information defining personalized graphical user interfaces of the collaboration environment; effectuate presentation of the personalized graphical user interfaces on computing platforms associated with the users upon instantiation of the collaboration environment by the users via the computing platforms; and/or perform other operations.

18 Claims, 4 Drawing Sheets

(56) References Cited

U.S. PATENT DOCUMENTS

| | | |
|---|---|---|
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | David |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,586,211 B2 * | 3/2020 | Steplyk ............ G06Q 10/101 |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Karsten |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Booking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |

(56) References Cited

U.S. PATENT DOCUMENTS

| | | |
|---|---|---|
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199113 A1 | 8/2009 | McWhinnie |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0080919 A1 | 3/2013 | Kiang |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0012616 A1 | 1/2014 | Moshenek |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |

(56) References Cited

U.S. PATENT DOCUMENTS

| | | |
|---|---|---|
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0337517 A1 | 11/2017 | Defusco |
| 2017/0344754 A1 | 11/2017 | Kumar |
| 2017/0346861 A1 | 11/2017 | Pearl |
| 2017/0351385 A1 | 12/2017 | Ertmann |
| 2017/0364214 A1* | 12/2017 | Javed ............... G06F 3/0482 |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0082255 A1* | 3/2018 | Rosati ............... G06Q 10/1053 |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189735 A1 | 7/2018 | Lo |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0300305 A1 | 10/2018 | Lam |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère et al. |
| 2019/0213509 A1 | 7/2019 | Burleson |
| 2019/0265821 A1 | 8/2019 | Pearl |
| 2019/0340296 A1 | 11/2019 | Cunico |
| 2019/0340554 A1 | 11/2019 | Dotan-Cohen |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0145239 A1 | 5/2020 | Ghods |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0035069 A1 | 2/2021 | Parikh |
| 2021/0049555 A1 | 2/2021 | Shor |
| 2021/0073697 A1* | 3/2021 | Paranjape ........ G06Q 10/0639 |
| 2021/0097466 A1 | 4/2021 | Sabo |
| 2021/0097490 A1 | 4/2021 | Ratcliff |
| 2021/0103451 A1 | 4/2021 | Sabo |
| 2021/0110347 A1 | 4/2021 | Khalil |
| 2021/0136012 A1 | 5/2021 | Barbitta |
| 2021/0149925 A1 | 5/2021 | Mann |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342361 A1 | 11/2021 | Radzewsky |

(56) References Cited

U.S. PATENT DOCUMENTS

| | | |
|---|---|---|
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0215315 A1 | 7/2022 | Sabo |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

"Rules of Data Conversion from Document to Relational Databases", published: 2014, publisher: Future-processing, pp. 1-8 (Year: 2014).

Critical chain project management, Wikipedia, archives org, Dec. 17, 2016 https://web.archive.org/web/20161217090326/https://en.wikipedia.org/wiki/Critical_chain_project_management (Year: 2016) 5 pages.

Critical Path Method, Wikipedia, archives org, Sep. 19, 2017 https://web.archive.org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

Wix.Com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

"U.S. Appl. No. 14/584,750, Examiner Interview Summary dated Feb. 25, 2016", 3 pgs.

"U.S. Appl. No. 14/584,750, Non Final Office Action dated Aug. 28, 2015", 21 pgs.

"U.S. Appl. No. 14/584,750, Notice of Allowance dated Mar. 28, 2016", 8 pgs.

"U.S. Appl. No. 14/584,750, Response filed Feb. 29, 2015 to Non Final Office Action dated Aug. 28, 2015", 16 pgs.

"U.S. Appl. No. 14/584,850, Final Office Action dated Sep. 1, 2017", 31 pgs.

"U.S. Appl. No. 14/584,850, Non Final Office Action dated Jan. 10, 2017", 9 pgs.

"U.S. Appl. No. 14/584,850, Response filed Apr. 10, 2017 to Non Final Office Action dated Jan. 10, 2017", 13 pgs.

"How to Asana: Inviting teammates to Asana." YouTube, Asana, Mar. 21, 2017, https://www.youtube.com/watch?v=TLOruY1KyxU (Year: 2017), 13 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBIQ7DJNinE (Year: 2016) (21 pages).

Asana Workload and Portfolios,youtube,excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos? (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA&list=PLJFG93oi0wJAi UwyOhlGWHdtJzJrzylBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, Wikipedia, archives org, Mar. 16, 2018 https://web.archive.org/web/20180316193655/https://en.wikipedia.org/wiki/Command_and_control (Year: 2018), 6 pages.

Hartmann, "TimeProjectscheduling with resource capacities and requests varying with time: a case study," 2013, Flexible services and manufacturing journal, vol. 25, No. 1, pp. 74-93 (Year: 2013).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

Paul Minors, How to automate your tasks, youtube excerpts, Oct. 18, 2019 https://www.youtube.com/watch?v=lwF9XyUQrzw (Year: 2019).

Prioritize My Tasks in Asana, Asana tutorial, youtube, excerpt, May 25, 2016 https://www.youtube.com/watch?v=UbCnMvw01nI (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https ://web.archive.org/web/20170708150928/https://asana.com/guide/resources/infosheets/where-does-asana-fit (Year: 2017) (5 pages).

(56) References Cited

OTHER PUBLICATIONS www.cogmotive.com/blog/author/alan Alan Byrne: "Creating a company Shared Calendar in Office 365"; pp. 1-17; Sep. 10, 2013.
(Tiburca, Andrew) Best Team Calendar Applications for 2018—Toggl https://toggl.com/blog/best-team-calendar-applications-for-2018 (Year: 2017).
Macro, computer science, Wikipedia, archives org Feb. 11, 2020 http://web.archive.org/web/20200211082902/https://en.wikipedia.org/wiki/Macro_(computer_science) (Year: 2020).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Dawei Li, "Deepcham: Collaborative Edge-Mediated Adaptive Deep Learning for Mobile Object Recognition", 2016, IEEE/ACM, pp. 64-76. (Year: 2016).
N. C. Romano, Fang Chen and J. F. Nunamaker, "Collaborative Project Management Software," Proceedings of the 35th Annual Hawaii International Conference on System Sciences, 2002, pp. 233-242, doi: 10.1109/HICSS.2002.993878.
Klipfoliio. "What is a Project Management Dashboard?" Jan. 18, 2021. <https://web.archive.org/web/20210128061955/https://www.klipfolio.com/resources/articles/project-management-dashboard> (Year: 2021) 6 pages.

\* cited by examiner

SYSTEMS AND METHODS TO PROVIDE PERSONALIZED GRAPHICAL USER INTERFACES WITHIN A COLLABORATION ENVIRONMENT

FIELD OF THE DISCLOSURE

The present disclosure relates to systems and methods to provide personalized graphical user interfaces within a collaboration environment.

BACKGROUND

Online web-based collaboration environments, sometimes referred to as work management platforms, may enable users to assign projects, tasks, or other assignments to assignees (e.g., other users) to complete. A collaboration environment may comprise an environment in which individual users and/or a virtual team of users does its work and enables users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment to its users. One way that operators look to improve the operation of the collaboration environment is to improve parts of the collaboration environment involving substantial human-machine interaction. Some of these improvements may be in the form of improved user interfaces that present information that would otherwise be stored in different records of the environment and/or not otherwise shown in a consolidated view. For example, users may traditionally have to navigate through one or more user interfaces that provide different pieces of information stored in one or more records in order for the users to obtain a more holistic view of the one or more records—for example, to be able to get an understanding of their current and/or future workload (e.g., what is due, what is past due, what should be prioritized, etc.). This may require a sophisticated knowledge of the collaboration environment because the users are tasked with 1) initially knowing what information may even be relevant to understanding their workload, 2) knowing where and how to navigate through the environment in order to collect the information, and/or 3) organizing and/or consolidating the found information to provide a meaningful overview. This required knowledge of the collaboration environment and the required interactions/navigations through the user interfaces themselves may be time consuming, may cause decreased workflow efficiency, and/or may be prone to user error. Accordingly, the inventors of the present disclosure have identified the need to operate a collaboration environment to include user interface(s) that accurately and effectively present information stored in records of the collaboration environment, as well as reducing the human-machine interventions required to identify the information for these user interfaces and/or generate the interfaces themselves.

One or more aspects of the present disclosure relates to a system configured to provide personalized graphical user interfaces within a collaboration environment. In some implementations, a personalized graphical user interface may be used to provide a summarized view of one or more of ongoing work, people that are frequently collaborated with, units of work that are frequently viewed, projects that are frequently viewed, and/or other information. The personalized graphical user interface may represent a landing page (sometimes referred to as a "homepage") when the users instantiate (e.g., launch) the collaboration environment on their computing platform. Providing users with a personalized graphical user interface may be useful when starting their day. Users may easily prioritize their work and jump into the work that matters most.

One or more implementations presented herein propose a way to provide users with personalized graphical user interfaces that act as dynamic landing pages/homepages for the collaboration environment. The personalized graphical user interfaces may include sets of interface elements presenting information pertinent to the work users are involved in. The information may include one or more of due dates, frequency of collaboration with other users, activity with certain work, and/or other information. By way of non-limiting illustration, the interface elements may present one or more values of one or more parameters that define the collaboration environment. In some implementations, the interface elements may be dynamically updated as the values change. Providing these updated values of parameters may maintain the information in the dynamic homepage to be in its most current state. In some implementations, users may customize the content displayed in the personalized graphical user interface. By way of non-limiting illustration, a customization panel and/or popup window may be provided which allows the user to customize the content (e.g., via widgets that correspond to different records) and/or aesthetic aspects (e.g., color, arrangement, and/or other aspects) of a personalized graphical user interface.

One or more implementations of a system configured to provide personalized graphical user interfaces within a collaboration environment may include one or more hardware processors configured by machine-readable instructions and/or other components. Executing the machine-readable instructions may cause the one or more hardware processors to facilitate providing personalized graphical user interfaces within a collaboration environment. The machine-readable instructions may include one or more computer program components. The one or more computer program components may include one or more of an environment state component, a homepage component, a user input component, an update component, a user interface component, and/or other components.

The environment state component may be configured to manage environment state information maintaining a collaboration environment and/or other information. The collaboration environment may be configured to facilitate interaction by users with the collaboration environment and/or each other. The environment state information may include one or more of user records, work unit records, project records, and/or other records. The user records may include user information comprising values of user parameters associated with the users of the collaboration environment. The work unit records may include work information comprising values of work unit parameters associated with units of work managed, created, and/or assigned within the collaboration environment. The project records may include project information comprising values of project parameters associated with projects managed within the collaboration environment. A project may include one or more units of work.

The homepage component may be configured to manage homepage information defining personalized graphical user interfaces of the collaboration environment. Individual personalized graphical user interfaces may correspond to individual users. The individual personalized graphical user interfaces may include individual sets of interface elements configured to display one or more values of one or more of the user parameters, the work unit parameters, the project parameters, and/or other parameters associated with the individual users. By way of non-limiting illustration, the homepage information may define a first personalized graphical user interface corresponding to a first user. The first personalized graphical user interface may display a first set of values of one or more of the user parameters, the work unit parameters, the project parameters, and/or other parameters associated with the first user.

The user input component may be configured to obtain input information conveying user input into the personalized graphical user interfaces. The user input may specify which of the values are to be displayed in individual interface elements in the individual sets of interface elements. By way of non-limiting illustration, the input information may convey first user input from the first user. The first user input may include specification of one or more of the values in the first set of values displayed in the first personalized graphical user interface.

The user interface component may be configured to effectuate presentation of the personalized graphical user interfaces on computing platforms associated with the users upon instantiation of the collaboration environment by the users via computing platforms. By way of non-limiting illustration, upon instantiation of the collaboration environment by the first user, the first personalized graphical user interface may be presented on a first computing platform associated with the first user.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
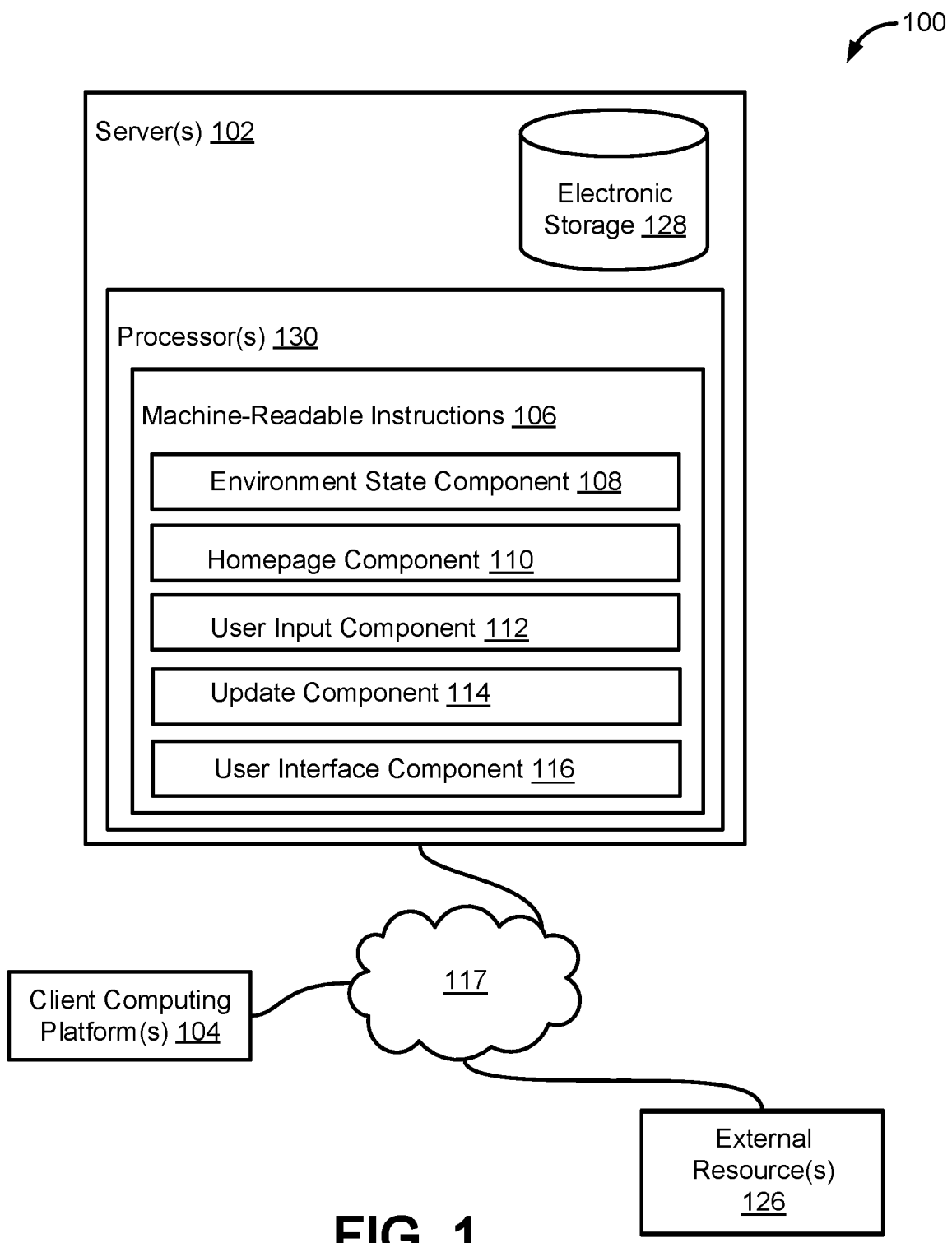
FIG. 1 illustrates a system configured to provide personalized graphical user interfaces within a collaboration environment, in accordance with one or more implementations.

FIG. 1 illustrates a system 100 configured to provide personalized graphical user interfaces within a collaboration environment, in accordance with one or more implementations. The personalized graphical user interfaces may include sets of interface elements presenting information pertinent to the work users are involved in. The personalized graphical user interface may represent a landing page (sometimes referred to as a "homepage") when the users instantiate (e.g., launch) the collaboration environment on their computing platform. Providing users with a personalized graphical user interface may be useful when starting their day. Users may easily prioritize their work and jump into the work that matters most.

In some implementations, system 100 may include one or more of one or more servers 102, one or more client computing platforms 104, external resource(s) 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate providing personalized graphical user interfaces within a collaboration environment. The computer program components may include one or more of an environment state component 108, a homepage component 110, a user input component 112, an update component 114, a user interface component 116, and/or other components.

Environment state component 108 may be configured to manage environment state information and/or other information used in maintaining a collaboration environment. The collaboration environment may be configured to facilitate interaction by users with the collaboration environment. The environment state information may include one or more of user records, work unit records, project records, objective records, and/or other records. The user records may include user information comprising values of user parameters associated with the users of the collaboration environment. The work unit records may include work information comprising values of work unit parameters associated with units of work managed, created, and/or assigned within the collaboration environment. The project records may include project information comprising values of project parameters associated with projects managed within the collaboration environment. The objective records may include objective information comprising values for objective parameters associated with business objectives defined within the collaboration environment.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by a given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, values of work unit parameters may include one or more of a unit of work name, a unit of work description, one or more unit of work dates (e.g., a start date, a due date or end date, a completion date, and/or dates), one or more users linked to a unit of work (e.g., an owner, one or more collaborators, collaborator access information, and/or other information), role information, a status parameter (e.g., an update, a hardcoded status update, a completed/incomplete/mark complete, a measured status, a progress indicator, quantity of sub-work units remaining for a given unit of work, measure of urgency, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), one or more performance/productivity metrics for a given unit of work, hierarchical information, one or more custom fields (e.g., priority, cost, stage, and/or other custom fields), and/or other information.

In some implementations, the one or more work unit parameters may include one or more of a work assignment parameter, work completion parameter, a work management parameter, a work creation parameter, and/or other parameters. The values of the work assignment parameter may describe and/or identify users assigned to the individual units of work. The values of the work management parameter may describe and/or identify users who manage the individual units of work. The values of the work creation parameter may describe the creation of individual units of work (e.g., when it was created, who created it, etc.).

The values of the work assignment parameter describing and/or identifying users assigned to the individual units of work may be determined based on one or more interactions by one or more users with a collaboration environment. In some implementations, one or more users may create and/or assign one or more units of work to themselves and/or another user. In some implementations, a user may be assigned a unit of work and the user may effectuate a reassignment of the unit of work from the user or one or more other users.

In some implementations, values of the work completion parameter may indicate that a status a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing by the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects created and/or managed within the collaboration environment. The project parameters may characterize one or more projects managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under a given project heading. In some implementations, projects may include one or more units of work that may directly facilitate progress toward fulfillment of the projects. Accordingly, completion of the set of units of work may directly contribute to progress toward fulfillment of the project. By way of non-limiting illustration, an individual project may be associated with a client and the units of work under the individual project heading may be work directly contributing to the fulfillment of a business relationship with the client.

The values of the project parameters may, by way of non-limiting example, include one or more of: one or more units of work supporting individual ones of the projects (which may include values of work unit parameters included in one or more work unit records), one or more users linked to the project (which may include values of user parameters defined by one or more user records), role information, one or more user comment parameters (e.g., a creator, a recipient, one or more followers, one or more other interested parties, content, one or more times, upvotes, other hardcoded responses, etc.), a project name, a project description and/or background summary, a project problem statement, a project solution statement, one or more risks associated with the project, one or more project dates (e.g., a start date, a due date, a completion date, and/or other project dates), one or more project collaborators (e.g., an owner, one or more other project collaborators, collaborator access information, and/or other information), a status and/or progress (e.g., an update, a hardcoded status update, a measured status, quantity of units of work remaining in a given project, completed units of work in a given project, and/or other status parameter), one or more resources, one or more business objectives supported by the projects, notification settings, permissions information, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, project records may include permissions information for the individual projects. The permissions may specify access restrictions for the individual project. The access restrictions may be specified on a user-basis, user role-bases (e.g., based on one or more of organization role, role in units of work, and/or project-level role), for groups of users, and/or specified in other ways.

Role information may be specified in one or more of the work unit records, project records, user records, and/or other records. The role information may specify roles of the users within the units of work, the projects, and/or a business organization as a whole. The roles may convey expected contribution of the users in completing and/or supporting the units of work and/or the projects. The individual roles of individual users within the units of work may be specified separately from the individual roles of the individual users within the projects. The project parameters may include a project role parameter characterizing the individual roles of the individual users with respect to individual projects.

A role may represent expected contribution of the users in completing and/or supporting the units of work and/or the projects. A role specified with respect to units of work and/or projects may be different from roles traditionally specified with respect to a business organization as a whole (e.g., President, CEO, intern, product designer, legal counsel, etc.). For example, an organization role may be "Product Designer"; a project role may be "Design Lead"; and a role on an individual unit of work may be "Approver."

A role within a unit of work may be specified based on one or more of a job title, a description of what the user should accomplish and/or plan on accomplishing for the given unit of work, and/or other specifications. By way of non-limiting illustration, a role within a unit of work may include one or more of general assignee, graphic designer, engineer, tester, writer, artist, mechanic, and/or other descriptions.

A role within a project (e.g., a "project-level role") may be specified based on a description of what the user may be supporting and/or plan on supporting for the given project, and/or other specifications. By way of non-limiting illustration, a role within a project may include one or more of owner, design, marketing, copy, legal, engineering, art director, and/or other descriptions. Although the specification of the role in a project may include the same or similar words as the role in a unit of work, the role in the project may enable and/or disable features within the collaboration environment otherwise not available to users of having roles in individual units of work but not at the project level. In some implementations, roles within a project may take on a more supervisory connotation than the roles within the individual units of work.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and identify sets of individual ones of the work unit records and/or project records that specify the units of work and/or projects as being associated with the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

The user information in the user records may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., user-name/password for one or more third-party applications), collaborator information, one or more favorites and/or priorities, schedule information, and/or other information.

In some implementations, collaborator information may specify a frequency at which one or more users collaborate with each other on a given unit of work and/or project. In some implementations, a "frequency" may be defined with respect to a threshold. A threshold may include at least one collaboration. A collaboration may include at least one action taken with respect to a given record. The action may include one or more of adding comments, sending direct communications, co-authoring content, conducting meetings, establishing assignee/assignor relationships, marking complete, marking incomplete, reassigning, and/or other actions. A threshold may include at least one collaboration with respect to at least one record. A threshold may include one or more collaborations over a given period of time. In some implementations, collaborator information may establish users as "frequent" collaborators with other users(s) on individual units of work and/or projects, and/or "infrequent" collaborators with other users(s) on individual units of work and/or projects.

The homepage component 110 may be configured to manage homepage information defining personalized graphical user interfaces of the collaboration environment. Individual personalized graphical user interfaces may correspond to individual users. The individual personalized graphical user interfaces may include individual sets of interface elements configured to display one or more of the values of one or more of the parameters defined within the environment state information. By way of non-limiting illustration, the individual sets of interface elements configured to display one or more of the values of one or more of the user parameters, the work unit parameters, the project parameters, and/or other parameters. By way of non-limiting illustration, the homepage information may define a first personalized graphical user interface corresponding to a first user. The first personalized graphical user interface may display a first set of values of one or more of the user parameters, the work unit parameters, the project parameters, and/or other parameters associated with the first user.

The values of the user parameters associated with an individual user and displayed in an individual personalized graphical user interface may include the collaborator information and/or other information. By way of non-limiting illustration, the values of the user parameters associated with an individual user and displayed in an individual personalized graphical user interface may characterize other users the individual users collaborate with and/or the messages sent to and/or from the other users. In some implementations, individual ones of the other users may be characterized by frequency of collaboration on units of work and/or projects. In some implementations, the individual ones of the other users may be characterized by the communications sent via textual messages. The frequency of communications may be defined as the most recent communications. In some implementations, the frequency of communications may be defined as the threshold of communications over a period of time.

The personalized graphical user interface may display information in the form of visual graphics. By way of non-limiting illustration, a portion of the personalized graphical user interface may display graphics representing frequent collaborators associated with an individual user. One or more interface elements representing the frequent collaborators may be interactive. In some implementations, when an interface element is selected representing a frequent collaborator, there may be a portion of the user interface that displays information about the frequent collaborator. The information displayed may include one or more of units of work assigned to the frequent collaborator, information identifying the frequent collaborator (e.g., name, username, email, phone number, avatar, and/or other information), content of collaborations between the individual user and the frequent collaborator, and/or other information. By way of non-limiting illustration, content of collaborations between the individual user and the frequent collaborator may include messages communicated between the individual user and the frequent collaborator. In some implementations, a portion of the personalized graphical user interface may display content of the messages in a portion dedicated to display messages. The messages may be organized by way of the latest messages sent or the highest frequency of messages sent between the individual user and the frequent collaborator. The manner in which the conversation list is presented may be pre-determined by the system and/or manually configured by the individual user.

The values of the work unit parameters associated with an individual user and displayed in an individual personalized graphical user interface may characterize one or more of the units of work assigned to the individual user. In some implementations, the one or more of the units of work assigned to the individual user presented in a personalized graphical user interface may include units of work having due dates approaching within a given timeframe. In some implementations, the one or more of the units of work assigned to the individual user presented in a personalized graphical user interface may include units of work assigned to the individual user and linked to one or more frequent collaborators. In some implementations, the values of the work unit parameters of one or more units of work associated with an individual user that have due dates approaching a given timeframe may characterize the units of work as being past due with respect to the given timeframe. In some implementations, the values of the work unit parameters of one or more units of work associated with an individual user that have due dates approaching a given timeframe may characterize the units of work as being presently due (e.g., on the current day). In some implementations, the values of the work unit parameters of one or more units of work associated with an individual user that have due dates approaching a given timeframe may characterize the units of work as nearing the given due date.

In some implementations, the values of the work unit parameters of one or more units of work presented in a personalized graphical user interface in may be organized based on the units of work being one or more of past a due date, presently due, and/or nearing the due date. In some implementations, the values may be presented as an arrangement of interface elements. The arrangement may be organized by one or more of pressing deadlines, frequency of activity, specific collaborators, and/or other considerations of organization.

The values of the project parameters associated with an individual user and displayed in an individual personalized graphical user interface may characterize one or more of the projects associated with the individual user. In some implementations, the values of the project parameters associated with an individual user may characterize one or more of the projects by specifying roles of individual users in one or more of the projects. By way of non-limiting illustration, one or more projects which an individual user has a managerial role may be displayed in a portion of the personalized graphical user interface.

In some implementations, the values of the project parameters associated with an individual user may characterize one or more of the projects by specifying the collaborators associated with the one or more projects. By way of non-limiting illustration, the one or more projects associated with an individual user and specific collaborators may be displayed in a portion of the personalized graphical user interface.

In some implementations, the values of the project parameters associated with an individual user may characterize one or more projects based on the individual user's frequency of visitation to individual project pages of the individual projects. In some implementations, visitation may be considered "frequent" if there are two or more visitations by the individual user to the individual project pages. In some implementations, visitation may be considered "frequent" if there are two or more visitations by the individual user to the individual project pages within a given timeframe. By way of non-limiting illustration, the one or more projects associated with frequent visitations may be displayed in a portion of the individual personalized graphical user interface.

In some implementations, an individual user's association with one or more projects may be defined by the user directly contributing to the one or more projects. An individual user may directly contribute to the one or more projects by the user being responsible for one or more units of work which affects the progress of the project's successful completion. By way of non-limiting illustration, the one or more projects associated with the individual user directly contributing may be displayed in a portion of the personalized graphical user interface.

In some implementations, an individual user's indirect association with one or more projects may be defined by a project having high activity. By way of non-limiting illustration, the one or more projects indirectly associated with the individual user may be displayed in a portion of the personalized graphical user interface if there have been many units of work completed within the one or more projects. By way of non-limiting illustration, the one or more projects indirectly associated with the individual user may be displayed in a portion of the personalized graphical user interface if there has been a high amount of communication between other users within one or more projects.

In some implementations, displaying the values of parameters may include determining visual representations of the values. The visual representations may be one or more of numeric representations, graphical representations (e.g., charts, graphs, etc.), and/or other representations. In some implementations, visual representations may be direct representations. By way of non-limiting illustration, a value of a parameter may be directly presented in a personalized graphical user interface. For example, a value of a project parameter for a project specifying that the project includes ten tasks may be represented in an interface element as "This project has ten tasks." In some implementations, visual representations may be indirect representations. By way of non-limiting illustration, a value of a work unit parameter may be used as a basis for determining a display that represents the value but may not directly and/or explicitly convey the value. By way of non-limiting illustration, a value of a work unit parameter for a unit of work specifying that the unit of work is past due may be represented in a visual graphic that draws the users attention to it more than other elements displayed on the user interface.

It is noted that the interface elements of the personalized graphical user interfaces may be organized in different ways according to the kinds of parameters being included in the personalized graphical user interface.

In some implementations, the personalized graphical user interfaces may provide access to one or more of the user records, the work unit records, the project records, and/or other records associated with the one or more of the values displayed in the personalized graphical user interfaces.

In some implementations, the one or more interface elements may be pre-configured on the personalized graphical user interfaces, corresponding to predetermined ones of the parameters. This may include values(s) of parameters having the relatively most change in relation to other values, value(s) of parameters having the relatively most user interaction in relation to the values than other values of parameters, and/or other considerations. By way of non-limiting illustration, if monitoring use of the collaboration environment by a set of users shows that the users update the description of a project (e.g., which is a value of a project parameter) on a continuing monthly basis, then the description of the project may be determined to have been impacted the most. Accordingly, the personalized graphical user interface may include at least one interface element preconfigured to display the project description in a personalized graphical user interface. By way of non-limiting illustration, if monitoring use of the collaboration environment by a set of users shows that the users frequently view the completed units of work in a project (which is a value of a project parameter) to determine the number of completed units of work compared to complete units of work, then the completed units of work in a project may be determined to have been impacted the most. Accordingly, the user interface may include at least one dynamic interface element (e.g., a software widget) pre-configured to display the number of completed units of work (or a chart showing the relationship between completed and incomplete units of work) in a personalized graphical user interface. In some implementations, the user interface may include a dynamic interface element displaying the number of units of work a user contributed on in a personalized graphical user interface. Contribution may include collaboration with a user linked to a unit of work, commented on, added attachments, and/or other considerations of contribution.

In some implementations, the personalized graphical user interfaces of the collaboration environment may be separate and distinct from individual views of the collaboration environment that display queues of the units of work assigned to the individual users. In some implementations, the personalized graphical user interfaces of the collaboration environment may be separate and distinct from individual pages that provide access to individual records. By way of non-limiting illustration, the personalized graphical user interfaces of the collaboration environment may be separate and distinct from one or more of user pages that provide access to individual user records, work unit pages that provide access to individual work unit records, project pages that provide access to individual project records, objective pages that provide access to individual objective records, and/or other pages that provide access to individual records.

The user input component 112 may obtain input information conveying user input into the personalized graphical user interfaces. The user input may specify which of the values are to be displayed in individual interface elements in the individual sets of interface elements. By way of non-limiting illustration, the input information may convey first user input from the first user. The first user input may specify one or more of the values in the first set of values displayed in the first personalized graphical user interface.

In some implementations, the user input may include identifying one or more of the individual users, individual units of work, individual projects, and/or other information. The user input may specify which of the values of the one or more of the parameters should be displayed in the individual interface elements of their personalized graphical user interface. A user may provide drag-and-drop input (and/or other input) via the interface elements to specify which values they should display. The input may cause the individual interface elements to take on the values of the given parameter thereby facilitate the generation of the personalized graphical user interfaces.

The update component 114 may be configured to monitor use of the collaboration environment by the users to determine change in the values of parameters of the collaboration environment. In some implementations, update component 114 may be configured to dynamically update the personalized graphical user interfaces based on the change in the values.

In some implementations, change in values may include one or both of user-initiated change in the values and/or automated change in the values. By way of non-limiting illustration, users may directly interact with the collaboration environment which causes change to one or more values. By way of non-limiting illustration, the collaboration environment may be configured with one or more automation rules that cause one or more values to change in response to trigger events.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, and/or other information.

The user interface component 116 may be configured to effectuate presentation of the personalized graphical user interfaces on computing platforms associated with the users. In some implementations, user interface component 116 may be configured to effectuate presentation of the personalized graphical user interfaces on computing platforms associated with the users upon instantiation of the collaboration environment by the users via the computing platforms. By way of non-limiting illustration, upon instantiation of the collaboration environment by the first user, the first personalized graphical user interface may be presented on a first computing platform associated with the first user.

Figure 3:
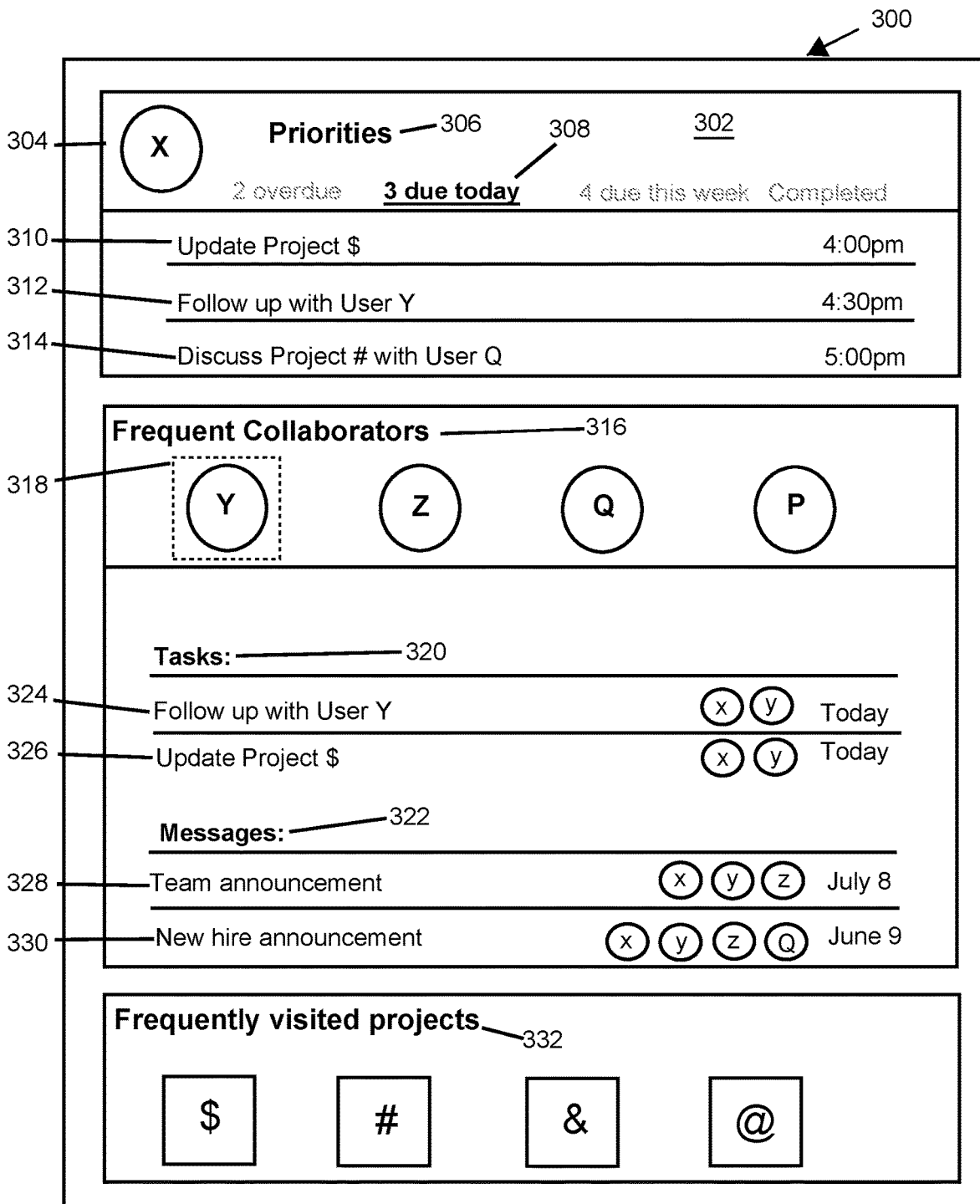
FIG. 3 illustrates a user interface, in accordance with one or more implementations.

FIG. 3 illustrates a user interface 300, in accordance with one or more implementations. The user interface 300 may include a view of a collaboration environment. In particular, the user interface 300 may comprise a personalized graphical user interface 302 for a user 304, illustrated as user "X". The personalized graphical user interface 302 may be comprised of different portions including one or more interface elements displaying one or more values of one or more of the user parameters, work unit parameters, project parameters, and/or other parameters.

The personalized graphical user interface 302 may comprise a first portion 306, illustrated as "Priorities". The first portion 306 may display values of work unit parameters for units of work assigned to the user and satisfying one or more due date criteria. The first portion 306 may be comprised of deadline driven categories 308, illustrated by three different categories where the "due today" category 308 is selected. The "due today" category 308 may be comprised of interface elements corresponding to lists of units of work. A first unit of work 310 for the due today category 308 may display "Update Project $". A second unit of work 312 for the due today category 308 may display "Follow up with User Y". A third unit of work 314 for the due today category 308 may display "Discuss project # with User Q". Individual ones of the units of work may be selected to take the user to a work unit page for the units of work.

The personalized graphical user interface 302 may comprise a second portion 316, illustrated as "Frequent Collaborators". The second portion 316 may display values of one or more user parameter for users determined to be frequent collaborators with user X. The second portion 316 may be comprised of a roster of users which user X 304 frequently collaborates with, illustrated as four different users, "Y", "Z", "Q", and "P". Individual ones of the users may be selected to populate the personalized graphical user interface with information about the selected user. By way of non-limiting illustration, User Y 318 may be selected. The second portion 316 of the personalized graphical user interface 302 may comprise a list 320 of units of work, illustrated as "Tasks", which user X and user Y collaborate on. The list 320 may be comprised of interface elements corresponding to different ones of the values of work unit parameters for the units of work that user Y and user X collaborate on. Individual interface elements may be selected to take the user to a work unit page for the individual units of work. A first value of a work unit parameter for a first unit of work 324 may display a title, illustrated as "Follow up with User Y". A second value of a work unit parameter of a second unit of work 326 may display a title, illustrated as "Update Project $".

In some implementations, the second portion 316 of the personalized graphical user interface 302 may comprise a list 322 showing content of messages communicated between user X and user Y, illustrated as "Messages". The list 322 may be comprised of interface elements corresponding to different ones of the messages. Individual ones of the interface elements may be selected to take the user to a communication page (e.g., message board, chat log, etc.) for the individual messages. For example, the list 322 may display the messages that were exchanged between user X and user Y, illustrated as "Team announcement" 328, and "New hire announcement" 330.

The personalized graphical user interface 302 may comprise a third portion 332, illustrated as "Frequently visited projects". The third portion 322 may display information about records that a user frequently visits. By way of non-limiting illustration, the third portion 322 may be comprised of interface elements corresponding to values of project parameters for one or more project records that the user frequently visits. The third portion 332 may be comprised of a list of interface elements representing projects which user X frequently visits, illustrated as projects "$", "#", "&", and "@". Individual ones of the interface elements may be selected to take the user to a project page for the individual projects.

Figure 4:
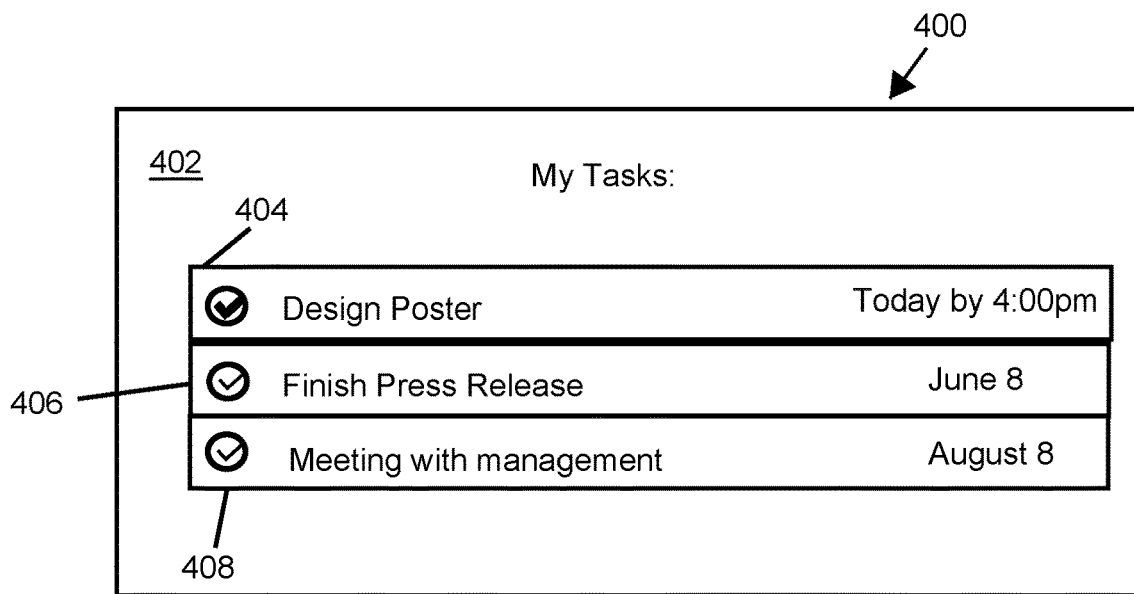
FIG. 4 illustrates a user interface, in accordance with one or more implementations.

FIG. 4 illustrates a user interface 400, in accordance with one or more implementations. The user interface 400 may include a view of a collaboration environment. In particular, the user interface 400 may a page 402 that displays a queue of the units of work assigned to a user, illustrated as "My Tasks." The queue may represent the units of work assigned to the user and/or organized in an order based on the individual end dates and/or other dates (e.g., start dates) and/or other ordering. By way of non-limiting illustration, the queue shown on the page 402 may include one or more of a first user interface element 404 representing a first unit of work, a second user interface element 406 representing a second unit of work, a third user interface element 408 representing a third unit of work, and/or other content. Individual ones of the user interface elements may be selected to take the user to individual work unit pages for the individual units of work. An individual work unit page may be a view within the collaboration environment dedicating to providing access to an individual work unit record. The individual work unit page may display values of one or more work unit parameters of the individual work unit record.

Figure 5:
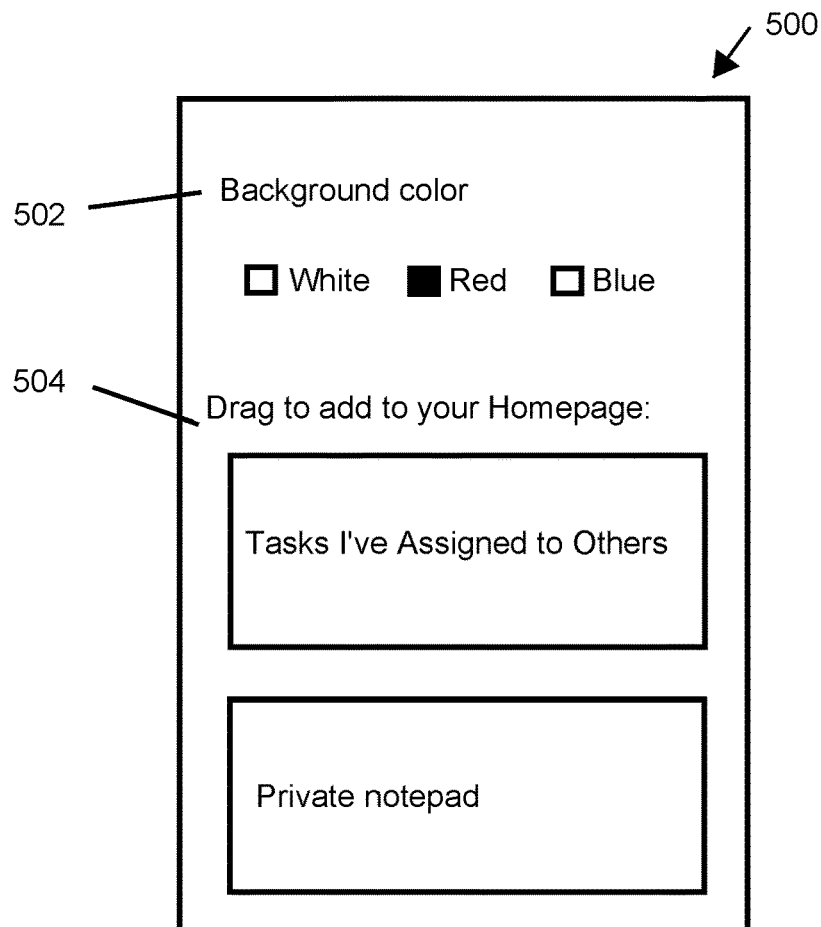
FIG. 5 illustrates a user interface, in accordance with one or more implementations.

FIG. 5 illustrates a user interface 500, in accordance with one or more implementations. The user interface 500 may represent a panel or window configured to facilitate customization of a personalized graphical user interface (e.g., user interface 300 in FIG. 3). The user interface 500 may be provided as a standalone window (e.g., pop up window), or as a side panel that may be a part of the personalized graphical user interface. The user interface 500 may be configured to receive user input to customize one or more of aesthetics of a personalized graphical user interface, the content of the personalized graphical user interface, and/or other features and/or functionality. By way of non-limiting illustration, a set of check boxes 502 may be provided to set the background color. By way of non-limiting illustration, a set of dynamic graphical user interface elements (e.g., widgets) 504 may be provided to add content to the personalized graphical user interface.

Referring back to FIG. 1, in some implementations, server(s) 102, client computing platform(s) 104, and/or external resource(s) 126 may be operatively linked via one or more electronic communication links. For example, such electronic communication links may be established, at least in part, via a network 117 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Server(s) 102 may include electronic storage 128, one or more processors 130, and/or other components. Server(s) 102 may include communication lines, or ports to enable the exchange of information with a network 117 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

External resource(s) 126 may include sources of information outside of system 100, external entities participating with system 100, and/or other resources. In some implementations, some or all of the functionality attributed herein to external resource(s) 126 may be provided by resources included in system 100.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116 and/or other components. Processor(s) 130 may be configured to execute components 108, 110, 112, 114, and/or 116 and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 130 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 130 may be configured to execute one or more additional components that may perform some or all of the functionality attributed below to one of components 108, 110, 112, 114, and/or 116.

Figure 2:
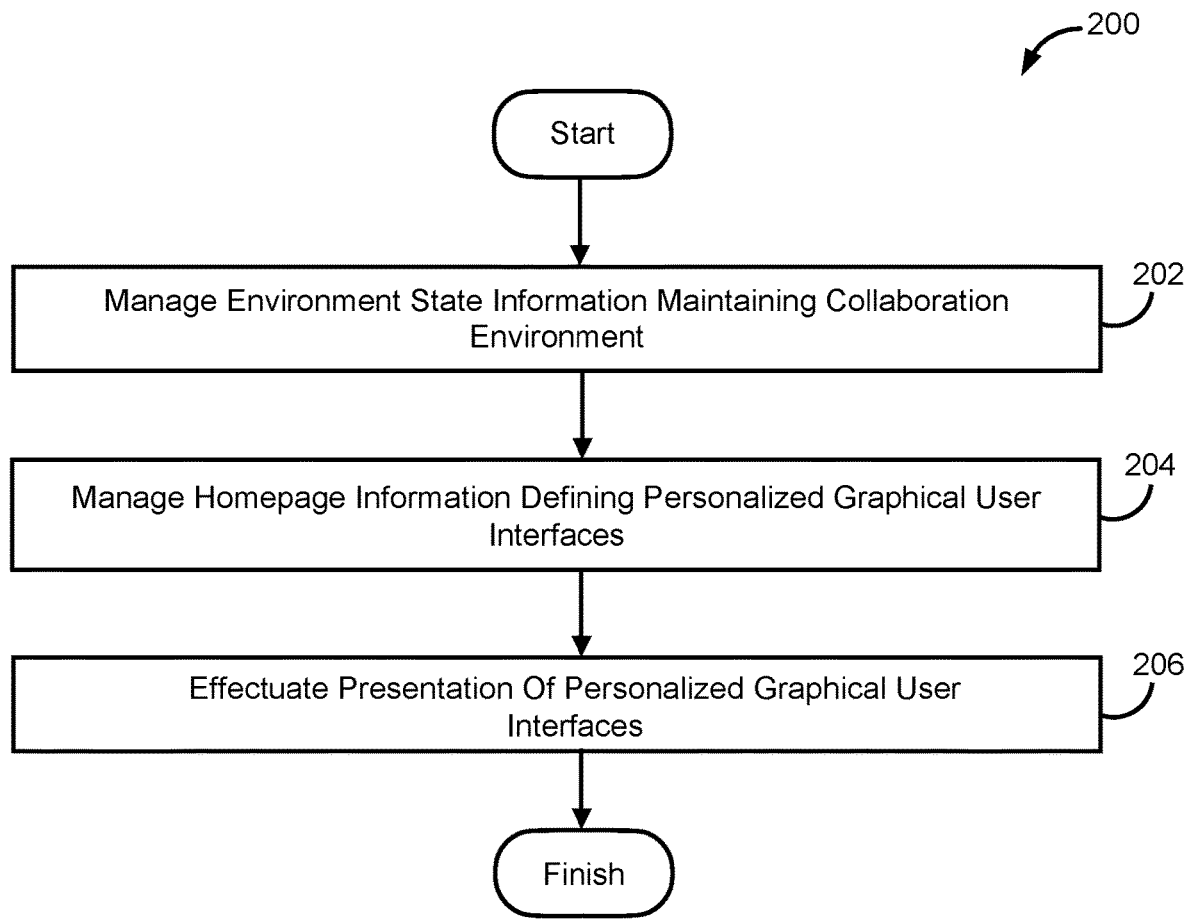
FIG. 2 illustrates a method to provide personalized graphical user interfaces within a collaboration environment, in accordance with one or more implementations.

FIG. 2 illustrates a method 200 to provide personalized graphical user interfaces within a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment and/or other information. The collaboration environment may be configured to facilitate interaction by users with the collaboration environment. The environment state information may include one or more of user records, work unit records, project records, and/or other records. The user records may include values of user parameters associated with the users of the collaboration environment. The work unit records may include values for work unit parameters associated with units of work managed, created, and/or assigned within the collaboration environment. The project records may include values for the project parameters associated with projects managed within the collaboration environment. Operation 202 may be performed by one or more hardware processors configured by machine-readable instructions including a component that is the same as or similar to environment state component 108, in accordance with one or more implementations.

An operation 204 may manage homepage information defining personalized graphical user interfaces of the collaboration environment. The individual personalized graphical user interfaces may correspond to individual users. In some implementations, the individual personalized graphical user interfaces may include individual sets of interface elements configured to display one or more of the values of the user parameters, the work unit parameters, the project parameters, and/or other parameters associated with the individual users. By way of non-limiting illustration, the homepage information may define a first personalized graphical user interface corresponding to a first user. The first personalized graphical user interface may display a first set of values of the user parameters, the work unit parameters, and the project parameters associated with the first user. Operation 204 may be performed by one or more hardware processors configured by machine-readable instructions including a component that is the same as or similar to homepage component 110, in accordance with one or more implementations.

An operation 206 may effectuate presentation of the personalized graphical user interfaces on computing platforms associated with the users upon instantiation of the collaboration environment by the users via the computing platforms. By way of non-limiting illustration, upon instantiation of the collaboration environment by the first user, the first personalized graphical user interface is presented on a first computing platform associated with the first user. Operation 206 may be performed by one or more hardware processors configured by machine-readable instructions including a component that is the same as or similar to user interface component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide user-customized graphical user interfaces within a collaboration environment, the system comprising:
one or more physical processors configured by machine-readable instructions to:
manage environment state information maintaining a collaboration environment, the collaboration environment being configured to facilitate interaction by users with the collaboration environment, the environment state information including user records, work unit records, and project records, the user records including values of user parameters associated with the users of the collaboration environment, the work unit records including values of work unit parameters associated with units of work managed, created, and/or assigned within the collaboration environment, the project records including values of project parameters associated with projects managed within the collaboration environment;

manage homepage information defining user-customized graphical user interfaces of the collaboration environment, individual user-customized graphical user interfaces corresponding to customizations made by individual users, wherein the individual user-customized graphical user interfaces include individual sets of interface elements configured to display one or more of the values of the user parameters, the work unit parameters, and the project parameters associated with the individual users, wherein the user-customized graphical user interfaces of the collaboration environment are separate and distinct from pages that display information from the user records, the work unit records, and the project records, such that the homepage information defines a first user-customized graphical user interface corresponding to a first user, the first user-customized graphical user interface displaying a first set of values of the user parameters, the work unit parameters, and the project parameters associated with the first user;

effectuate presentation of the user-customized graphical user interfaces on computing platforms associated with the users upon instantiation of the collaboration environment by the users via the computing platforms, such that upon instantiation of the collaboration environment by the first user, the first user-customized graphical user interface is presented on a first computing platform associated with the first user;

obtain input information characterizing user input into the user-customized graphical user interfaces, the user input including selection of individual ones of the interface elements of the user-customized graphical user interfaces, such that the input information characterizes first user input into the first user-customized graphical user interface; and effectuate presentation of individual ones of the pages based on the input information, such that:
responsive to the first user input including selection of a first interface element, effectuate presentation of a first user page;
responsive to the first user input including selection of a second interface element, effectuate presentation of a first work unit page; and
responsive to the first user input including selection of a third interface element, effectuate presentation of a first project page.

2. The system of claim 1, wherein the one or more physical processors are further configured by the machine-readable instructions to:
obtain further input information conveying further user input into the user-customized graphical user interfaces, the further user input specifying which of the values are to be displayed in individual interface elements in the individual sets of interface elements, such that the further input information conveys second user input from the first user, the second user input specifying one or more of the values in the first set of values displayed in the first user-customized graphical user interface.

3. The system of claim 1, wherein the values of the user parameters associated with an individual user and displayed in an individual user-customized graphical user interface characterize other users the individual user collaborates with, and/or messages sent to and/or from the individual user.

4. The system of claim 1, wherein the values of the work unit parameters associated with an individual user and displayed in an individual user-customized graphical user interface characterize one or more of the units of work assigned to the individual user and having due dates approaching within a given timeframe and/or one or more of the units of work assigned to the individual user and having one or more frequent collaborators.

5. The system of claim 1, wherein the values of the project parameters associated with an individual user and displayed in an individual user-customized graphical user interface characterize one or more of the projects associated with the individual user.

6. The system of claim 1, wherein the pages being navigated to from the user-customized graphical user interfaces provide access to the user records, the work unit records, and the project records.

7. The system of claim 1, wherein the one or more physical processors are further configured by the machine-readable instructions to:
monitor use of the collaboration environment by the users to determine change in the values of the user parameters, the work unit parameters, and the project parameters associated with the individual users; and
dynamically update the user-customized graphical user interfaces based on the change in the values.

8. The system of claim 7, wherein the change in the values includes one or both of user-initiated change in the values or automated change in the values.

9. The system of claim 1, wherein the user-customized graphical user interfaces of the collaboration environment are separate and distinct from individual pages that display queues of the units of work assigned to the individual users.

10. A method to provide user-customized graphical user interfaces within a collaboration environment, the method comprising:
managing environment state information maintaining a collaboration environment, the collaboration environment being configured to facilitate interaction by users with the collaboration environment, the environment state information including user records, work unit records, and project records, the user records including values of user parameters associated with the users of the collaboration environment, the work unit records including values of work unit parameters associated with units of work managed, created, and/or assigned within the collaboration environment, the project records including values of project parameters associated with projects managed within the collaboration environment;
managing homepage information defining user-customized graphical user interfaces of the collaboration environment, individual user-customized graphical user interfaces corresponding to individual users, wherein the individual user-customized graphical user interfaces include individual sets of interface elements configured to display one or more of the values of the user parameters, the work unit parameters, and the project parameters associated with the individual users, wherein the user-customized graphical user interfaces of the collaboration environment are separate and distinct from pages that display information from the user records, the work unit records, and the project records, including managing the homepage information defining a first user-customized graphical user interface corresponding to a first user, the first user-customized graphical user interface displaying a first set of values of the user parameters, the work unit parameters, and the project parameters associated with the first user;

effectuating presentation of the user-customized graphical user interfaces on computing platforms associated with the users upon instantiation of the collaboration environment by the users via the computing platforms, including upon instantiation of the collaboration environment by the first user, presenting the first user-customized graphical user interface on a first computing platform associated with the first user, obtaining input information characterizing user input into the user-customized graphical user interfaces, the user input including selection of individual ones of the interface elements of the user-customized graphical user interfaces, such that the input information characterizes first user input into the first user-customized graphical user interface; and effectuating presentation of individual ones of the pages based on the input information, including:
  responsive to the first user input including selection of a first interface element, effectuating presentation of a first user page;
  responsive to the first user input including selection of a second interface element, effectuating presentation of a first work unit page; and
  responsive to the first user input including selection of a third interface element, effectuating presentation of a first project page.

11. The method of claim 10, further comprising:
obtaining further input information conveying further user input into the user-customized graphical user interfaces, the further user input specifying which of the values are to be displayed in individual interface elements in the individual sets of interface elements, including obtaining the further input information conveying second user input from the first user, the second user input specifying one or more of the values in the first set of values displayed in the first user-customized graphical user interface.

12. The method of claim 10, wherein the values of the user parameters associated with an individual user and displayed in an individual user-customized graphical user interface characterize other users the individual user collaborates with, and/or messages sent to and/or from the individual user.

13. The method of claim 10, wherein the values of the work unit parameters associated with an individual user and displayed in an individual user-customized graphical user interface characterize one or more of the units of work assigned to the individual user and having due dates approaching within a given timeframe and/or one or more of the units of work assigned to the individual user and having one or more frequent collaborators.

14. The method of claim 10, wherein the values of the project parameters associated with an individual user and displayed in an individual user-customized graphical user interface characterize one or more of the projects associated with the individual user.

15. The method of claim 10, wherein the pages being navigated to from the user-customized graphical user interfaces provide access to the user records, the work unit records, and the project records.

16. The method of claim 10, further comprising:
  monitoring use of the collaboration environment by the users to determine change in the values of the user parameters, the work unit parameters, and the project parameters associated with the individual users; and
  dynamically updating the user-customized graphical user interfaces based on the change in the values.

17. The method of claim 16, wherein the change in the values includes one or both of user-initiated change in the values or automated change in the values.

18. The method of claim 10, wherein the user-customized graphical user interfaces of the collaboration environment are separate and distinct from individual pages that display queues of the units of work assigned to the individual users.

* * * * *